United States Patent [19]

Jacobs-Cook et al.

[11] Patent Number: 5,384,872
[45] Date of Patent: Jan. 24, 1995

[54] OPTICAL DEVICE AND A METHOD OF MANUFACTURE THEREOF

[75] Inventors: Alan J. Jacobs-Cook; Peter E. M. Frere; Mark E. C. Bowen, all of Birmingham, England

[73] Assignee: Lucas Industries Public Limited Company, United Kingdom

[21] Appl. No.: 9,879

[22] Filed: Jan. 27, 1993

[30] Foreign Application Priority Data

Feb. 14, 1992 [GB] United Kingdom ............... 9203128

[51] Int. Cl.⁶ .............................................. G02B 6/36
[52] U.S. Cl. ............................... 385/31; 385/52; 385/55
[58] Field of Search ............. 385/31, 32, 33, 38, 385/49, 52, 55, 51, 95

[56] References Cited

U.S. PATENT DOCUMENTS

| | | | |
|---|---|---|---|
| 4,130,343 | 12/1978 | Miller et al. | 385/22 X |
| 4,210,923 | 7/1980 | North et al. | 385/52 X |
| 4,294,510 | 10/1981 | Chappell | 385/52 |
| 4,541,159 | 9/1985 | Michel et al. | 385/52 X |
| 4,810,557 | 3/1989 | Blonder | 385/49 X |
| 4,937,808 | 6/1990 | Shimada et al. | 385/33 X |
| 4,948,219 | 8/1990 | Seino et al. | 385/95 |
| 5,071,213 | 12/1991 | Chan | 385/52 |
| 5,087,124 | 2/1992 | Smith et al. | 356/358 |
| 5,121,457 | 6/1992 | Foley et al. | 385/52 X |
| 5,243,673 | 9/1993 | Johnson et al. | 385/55 X |

*Primary Examiner*—Akm E. Ullah
*Attorney, Agent, or Firm*—Andrus, Sceales, Starke & Sawall

[57] ABSTRACT

A block of monocrystalline silicon oriented so as to have a body surface aligned in a {110} crystallographic plane is selectively etched so as to define a groove for receiving an optical waveguide and a reflecting surface facing the groove. The groove is aligned with a <110> crystallographic axis. The reflecting surface is in a {100} crystallographic plane. Thus, the groove is parallel to the body surface and the reflecting surface is at 45° to the body surface.

16 Claims, 4 Drawing Sheets

OPTICAL DEVICE AND A METHOD OF MANUFACTURE THEREOF

BACKGROUND OF THE INVENTION

The present invention relates to an optical device and a method of manufacturing a device. Such a device provides accurately aligned optical paths and may be used in association with a micromachined structure, such as a silicon bridge to form a transducer, or with devices where optical alignment is required.

Pages 186 to 189 of a philosophical dissertation by Rudolf A. Buser submitted to the University of Neuchatel, Switzerland, entitled "Theoretical and Experimental Investigations on Silicon Single Crystal Resonant Structures" disclose an arrangement for illuminating a resonant beam cantilever with optical radiation from an optical fibre. The fibre is located in a groove of V-shaped cross section formed by etching from a surface of monocrystalline silicon aligned in a {100} crystallographic plane. The end of the optical fibre faces a mirror surface formed by etching to reveal a transverse surface in one of the {111} crystallographic planes. The cantilever is formed above the mirror surface such that optical radiation, such as visible light or infrared radiation, emitted from the end of the fibre is reflected by the mirror surface onto the cantilever. This arrangement functions as a resonant beam transducer, for instance for measuring pressure.

Because of the crystallographic alignment of the mirror surface with respect to the main surface of the device, the optical axis of the fibre intersects the mirror surface at an angle of 54.7°. The cantilever is arranged such that the reflected radiation from the mirror surface is incident on the cantilever. However, reflected radiation from the cantilever is substantially not reflected back along the optical axis of the fibre, so that separate means are required in order to monitor the resonant frequency of the cantilever, which resonant frequency is a function of the applied pressure or other parameter to be measured.

US 5 071 213 discloses a similar arrangement for coupling an optical fibre to an opto-electronic device. The fibre is held in a groove of V-shaped cross section formed by etching a working surface of a silicon substrate aligned in a <100> direction. The end of the fibre is held adjacent a transverse surface. The transverse surface is at an angle of approximately 55° with respect to the working surface. Light from the fibre is directed towards the transverse surface, from where it is reflected to the opto-electronic device.

SUMMARY OF THE INVENTION

According to a first aspect of the present invention there is provided an optical device, comprising a body of monocrystalline silicon having a body surface aligned in a {110} crystallographic plane, a groove formed in the body surface for containing a optical waveguide, and an optical reflector facing an end portion of the groove and having an optically reflective surface in a {100} crystallographic plane, the end portion of the groove having a longitudinal axis substantially along a <110> crystallographic axis. According to a second aspect of the present invention there is provided a method of making an optical device, comprising: etching a body of monocrystalline silicon having a body surface aligned in a {110} crystallographic plane to form an optical reflector by revealing an optically reflective surface in a {100} crystallographic plane; and forming a groove for containing an optical waveguide, the groove having an end portion having a longitudinal axis substantially aligned along a <110> crystallographic axis, the optical reflector facing the end portion.

Advantageously the groove has groove surfaces in {111} crystallographic planes.

The groove and the optically reflective surface may be formed by masking selected areas of the body surface with an etch resistant mask and etching the unmasked body surface areas, for instance with potassium hydroxide. Such an etching process is anisotropic and leads to the formation of the plane surfaces. The groove can be formed to have either a 'V' or a trapezoidal cross-section by such etching. Alternatively the groove may be formed by plasma etching. Plasma etching enables groove surfaces to be formed in other than {111} crystallographic planes, for example to provide a groove having steep side walls to provide a substantially rectangular cross-section.

The body may comprise a relatively flat or thin cuboid and may be etched through to form a well with one side of the well defined by the optically reflective surface.

A micromachined structure, such as a resonant bridge, may be arranged in the path of optical radiation from the optical fibre reflected from the optical reflector. The structure may be formed as a separate device attached to the body or may be formed integrally with the body, for instance by doping e.g. by boron to form an etch-resistant portion of the body.

The device may be used with other structures, such as electro-optic devices e.g. laser diodes, where optical alignment is required.

The optical waveguide may be an optical fibre. The fibre may be positioned in the groove such that the end of the fibre is adjacent or touching the optical reflector.

Advantageously an embedded optical waveguide may be formed in a portion of the groove. Preferably the embedded optical waveguide seals the inner end of the groove in vacuum against fluid flow along the groove. The embedded optical waveguide may comprise a core and cladding, the core having a higher refractive index than the cladding. The embedded optical waveguide may be formed by depositing or growing suitable transparent materials within the groove. Suitable materials include silica, doped silica and silicon oxynitride.

The groove may have portions of different cross-section. One portion of the groove may contain an embedded optical waveguide and another portion of the groove may be shaped to accept an optical fibre.

It is thus possible to provide a device which allows accurate alignment of an optical waveguide and optical reflector to be achieved simply and by means of mass-production techniques. Several devices may be formed simultaneously on a silicon wafer before splitting into individual devices, before or after optical fibres have been mounted to the devices. The crystallographic orientation allows the optical axis of the waveguide to be accurately aligned at 45° to the optical reflector. Thus, when a structure such as a resonant bridge is located in the reflected path from the optical reflector, radiation reflected from the structure returns along the same path via the optical reflector into the optical fibre, thus allowing illumination and detection or measurement to be performed using only a single optical waveguide such as an optical fibre or fibre bundle. The device may be made using essentially conventional techniques for instance of the type used in the manufacture of silicon integrated circuits and silicon microstructures so that devices such as transducers can be manufactured easily and inexpensively without requiring separate steps for achieving optical alignment of the optical waveguides.

BRIEF DESCRIPTION OF THE DRAWINGS

The invention will be further described, by way of example, with reference to the accompanying drawings, in which.

DETAILED DESCRIPTION OF THE PREFERRED EMBODIMENTS

A thin rectangular or square wafer 1 of monocrystalline silicon has a plane upper surface 2 oriented in a {110} plane of the silicon crystalline structure. The surface 2 is coated with a mask 3, for instance by photolithographic techniques, of etch-resistant material. The other surfaces of the wafer 1 are likewise coated with etch-resistant material, and the unmasked portion of the surface 2 is then etched by immersion in concentrated potassium hydroxide solution.

Figure 1:
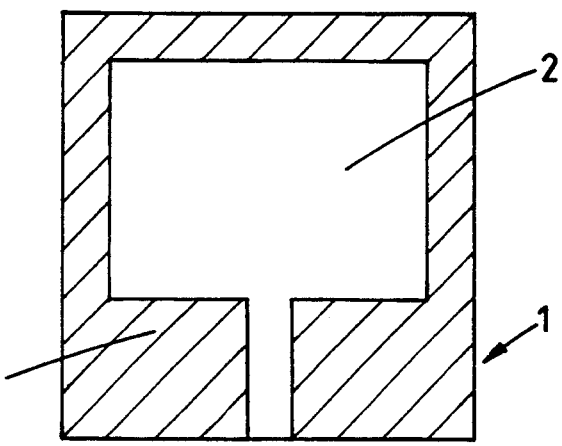
FIG. 1 is a plan view showing a step in the manufacture of a device constituting an embodiment of the invention.
Figure 2:
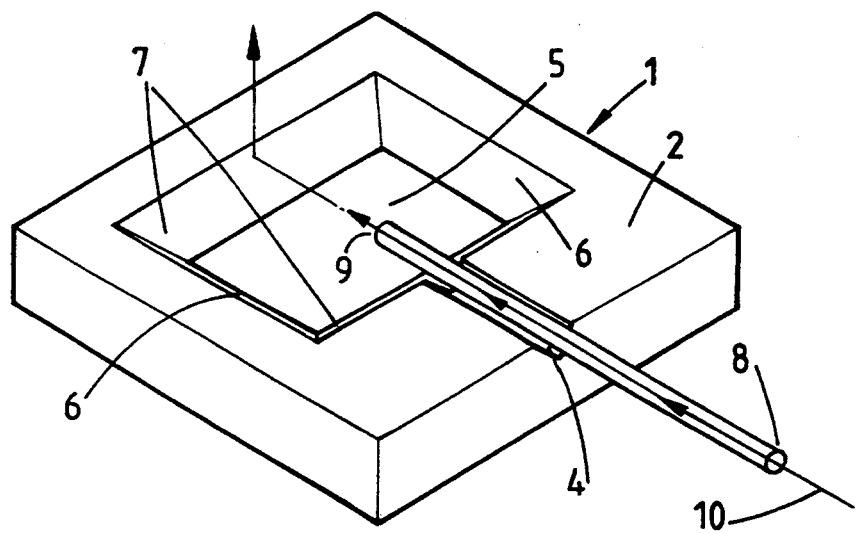
FIG. 2 is a perspective view of a device constituting an embodiment of the invention.

The orientation of the crystalline planes with respect to the mask 3 is illustrated in FIG. 2 and is such that a groove 4 of V-shaped cross section is formed in the surface 2 by groove surfaces aligned in the {111} crystallographic planes. In particular, the monocrystalline silicon is highly resistant to etching by potassium hydroxide perpendicularly to these planes so that the V-shaped groove is formed by etching until the groove surfaces are revealed, after which further etching virtually ceases. The planes are arranged at an angle of 35.3° to the surface 2. The groove is thus parallel with the body surface (2) and parallel to a <110> crystallographic axis.

A well 5 is formed during etching and extends partially through the thickness of the wafer 1. Sides of the well are defined by surfaces 6 which are also aligned in the {111} crystallographic planes of the silicon and by surfaces 7 in the {100} crystallographic planes all of which are revealed by the etching. Etching perpendicularly to these surfaces proceeds relatively slowly so that well-defined substantially plane surfaces are formed by the etching process. Thus, the time of immersion in the etchant is not critical and the formation of the groove 4 and the well 5 may be achieved in a single etching step.

An optical fibre 8 is inserted into the groove 4 with its end 9 accurately cut perpendicularly to the optical axis 10 of the fibre within the groove 4. If required, the end 9 may be formed with a convex surface, for instance by dipping in hydrofluoric acid, so as to provide collimation of optical radiation exiting through the end 9. The end 9 faces the opposite surface 7 such that the optical axis 10 intersects the surface. The surfaces 7 are disposed at an angle of 45° with respect to the surface 2 so that the surface 7 acts as an optical mirror reflecting radiation such as visible light or infrared radiation through 90°. The fibre 8, which may operate in single mode or multimode, is pushed along the longitudinal axis of the groove 4 so that the end 9 just touches the mirror surface 7 as shown in FIG. 3.

Figure 3:
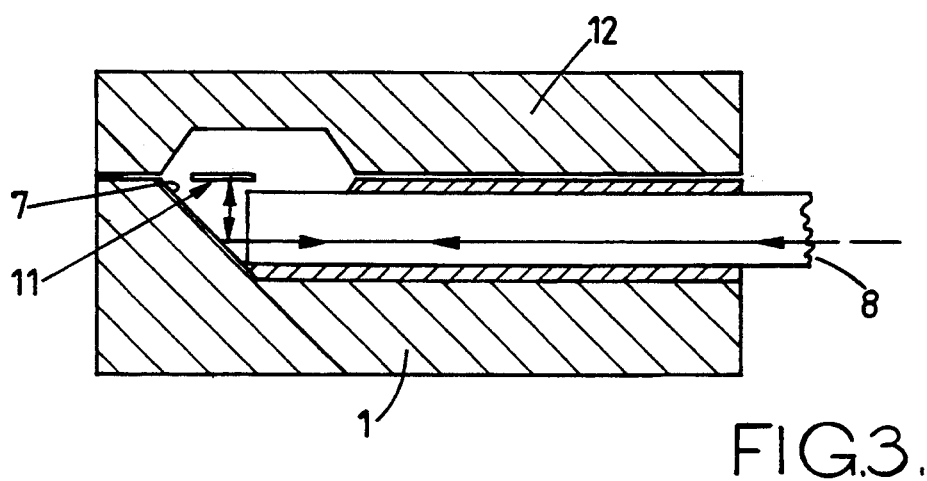
FIG. 3 is a cross sectional view of a transducer including the device of FIG. 2.

FIG. 3 illustrates a transducer including the alignment device of FIG. 2. A resonant bridge 11 is formed above the mirror surface 7 and receives light passing along the optical fibre 8 and reflected from the mirror surface 7 through 90°. Light reflected from the bridge 11 returns along the same optical path in the opposite direction so that energization and detection or measurement of the resonant frequency of the bridge 11 can be performed by means of a single optical fibre. A physical property to be measured alters the resonant frequency of the bridge 11 which, in turn, is detected to provide a measurement of the physical property or parameter.

A cover 12 is provided above the surface 2 of the alignment device. For instance, the cover 12 may comprise silicon with the bridge 11 as an integral part thereof and may be fusion-bonded to the wafer 1. Alternatively, the cover 12 may be made of glass and may be electrostatically bonded to the wafer 1.

Figure 4:
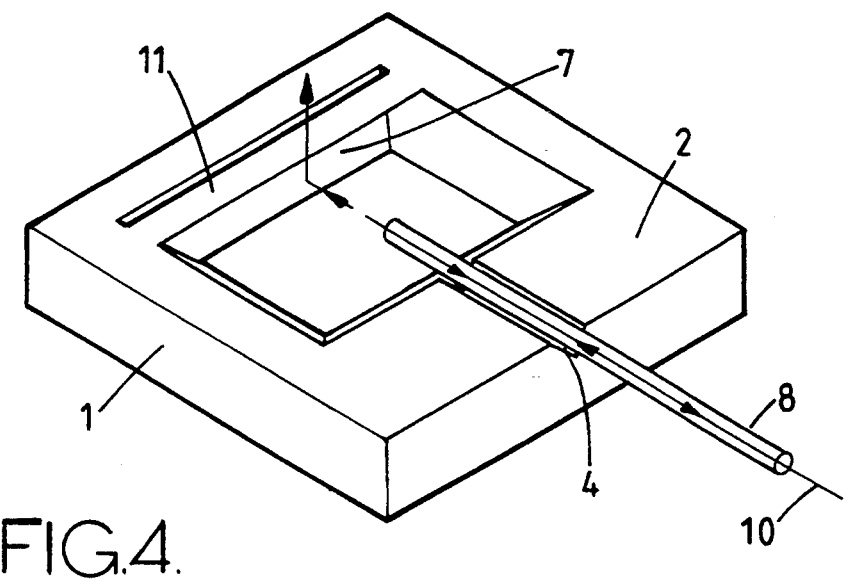
FIG. 4 is perspective view of another device constituting an embodiment of the invention.
Figure 5:
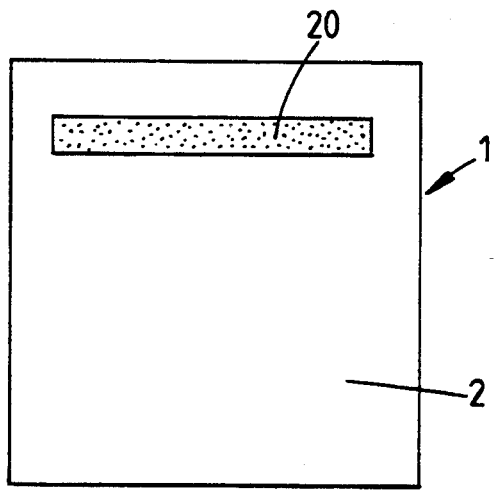
FIGS. 5 and 6 illustrate steps in the manufacture of the device of FIG. 4.
Figure 6:
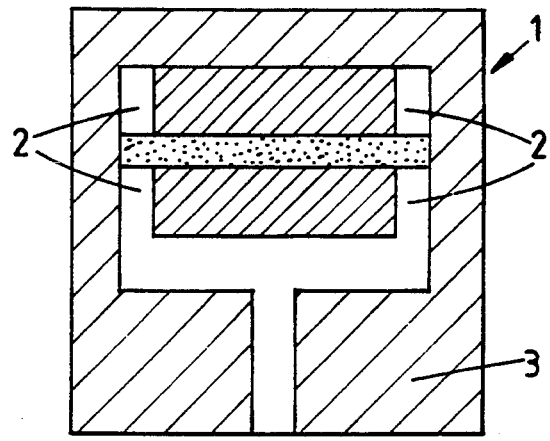

FIG. 4 illustrates another alignment device which differs from that of FIG. 2 in that the resonant bridge 11 is formed integrally with the wafer 1. In order to form the bridge 11, a surface portion 20 of the wafer is doped with boron or any other suitable material so as to provide a thin rectangular surface portion which is resistant to etching. The mask 3 as shown in FIG. 6 is then applied to the surface 2 of the wafer with the remaining surfaces being suitably protected and the unmasked areas of the surface 2 are etched by means potassium hydroxide etchant as described hereinbefore. This produces the structure shown in FIG. 4 which is substantially identical to that of FIG. 2 except for the bridge 11 which, being resistant to etching, is formed above the mirror surface 7.

Multimode optical fibre, such as 50/125 graded index fibre, is especially suitable for use with devices including transducers, such as those shown in FIGS. 3 and 4. The diameter of the core of the fibre 8 is typically of the same order as the width of the resonator 11 and therefore provides efficient coupling of light. The outer diameter of the fibre is 125 μm and consequently there is a gap of approximately 125 μm between the end of the fibre 8 and the resonator 11 when the end of the fibre abuts the surface 7, as shown in FIG. 3.

As noted hereinabove, a lens may be formed at the end 9 of the fibre 8. The inclusion of a lens improves both the amount of light coupled from the fibre to the resonator and the amount of light coupled to the fibre from the resonator. The latter is important for interferometric detection of resonator motion.

A lens may be formed on the fibre 8 by stripping a buffer coating off an end portion of the fibre and then cleaving the end of the fibre. After cleaning with isopropyl alcohol, the end of the fibre is immersed in a solution comprising ten parts ammonium fluoride 40 wt. % to one part hydrofluoric acid 48 wt. % for approximately 1 hour, after which time a convex lens has formed in the core of the fibre. The convex etching profile arises due to variation of the dopant from the center of the core to the periphery thereof.

Figure 7:
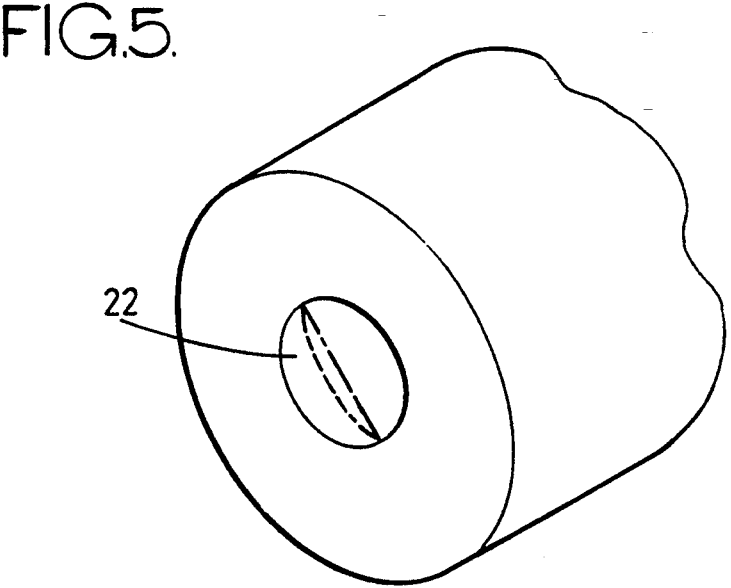
FIG. 7 is a diagrammatic perspective view of a lens formed at the end of an optical fibre.

FIG. 7 shows the end of a 50/125 graded index fibre after etching. The chain line outlines part of the convex surface of the lens 22 and the chain-dot line outlines part of a corresponding plane surface of the lens in the same plane as the periphery of the convex surface.

Experiments with a transducer of the type shown in FIG. 3 showed that, with an unlensed fibre, light was incident on the resonator 11 with a spot size of 75 μm whereas, with a lensed fibre, the spot size was reduced to 62 μm. The coupling efficiency for illuminating the resonator 11 is inversely proportional to the cross sectional area of the optical spot.

Thus the lensed fibre shows a 46% improvement in coupling efficiency over the unlensed fibre. Furthermore, light must also be collected from the resonator 11 and, since the light from the lensed fibre diverges less than the light from the unlensed fibre, further improvement in efficiency is expected.

The groove 4 is not limited to a "V" cross-section as defined by the {111} crystallographic planes. The anisotropic chemical etching process may be terminated before the "V" shape is fully completed, thereby producing a groove having a lower surface in a {110} crystallographic plane and side walls defined by {111} crystallographic planes.

Figure 8A:
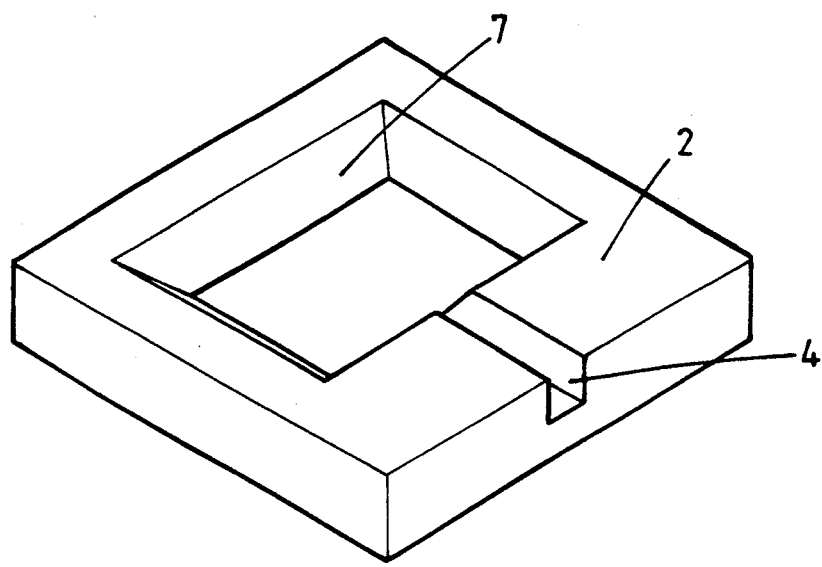
FIGS. 8a and 8b are perspective views of a device constituting another embodiment of the present invention.

Alternatively the groove 4 can be formed by plasma etching of the silicon. Using this technique it is possible to form a groove 4 having walls in planes other than {111} crystallographic planes, for example a groove having a substantially rectangular cross-section may be etched, as shown in FIG. 8a. The groove is etched so that the longitudinal axis of the groove is parallel to a <110> crystallographic axis.

Figure 8B:
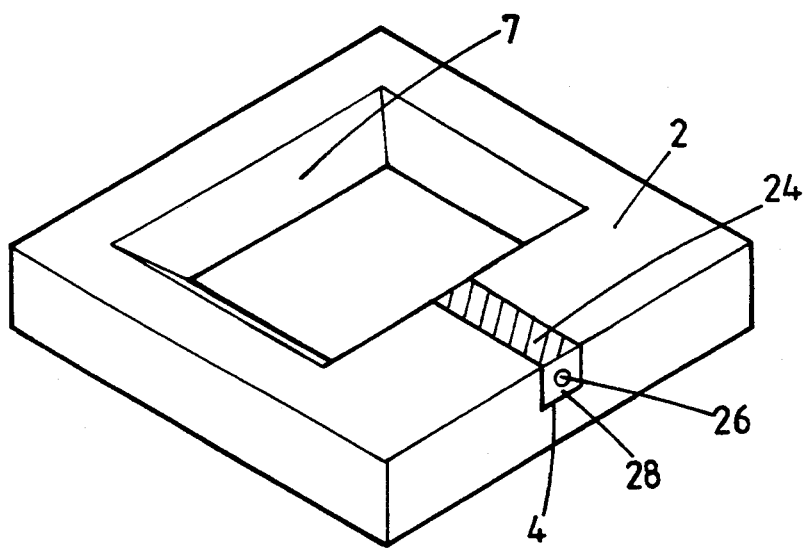

An embedded optical waveguide 24 can be formed in the groove 4, as shown in FIG. 8b. Optically transparent materials are deposited or chemically grown into the groove 4 to form the optical waveguide 24. Materials such as silica, doped silica, silicon oxynitride(SiO$_x$N$_y$) or other materials with appropriate optical properties can be used. The refractive index of the material or materials of the embedded optical waveguide may vary with position. The waveguide 24 shown in FIG. 8b has a core 26 and cladding 28, the refractive index of the core 26 being greater than the refractive index of the cladding 28.

Figure 9:
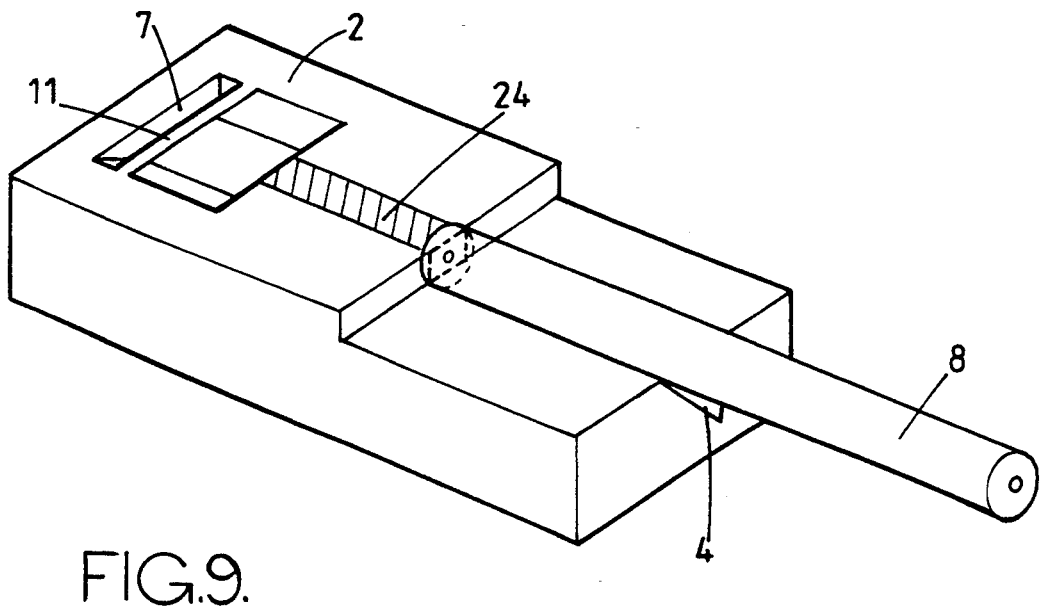
FIGS. 9 and 10 are perspective and cross-sectional views, respectively, of a device constituting a further embodiment of the present invention.
Figure 10:
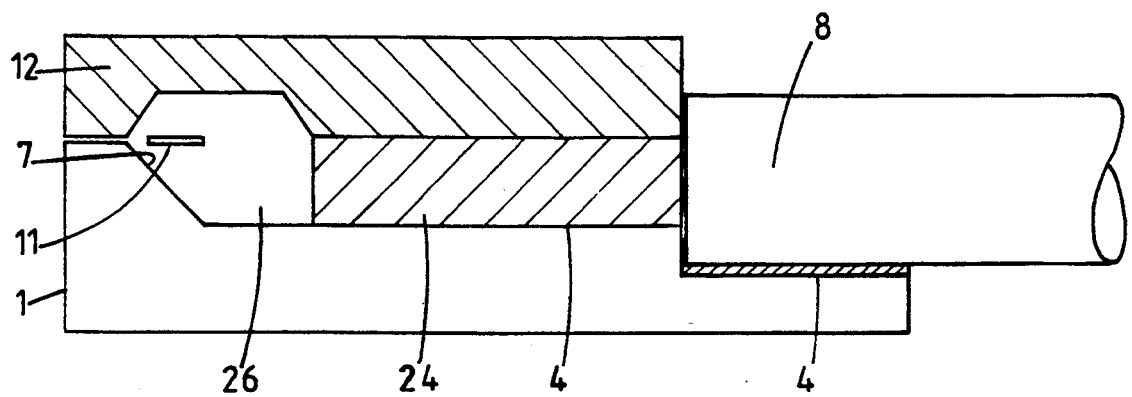

A device incorporating an embedded waveguide 24 and a groove for aligning an optical fibre 8 is shown in FIGS. 9 and 10. Such a construction has particular advantages when a cover 12 is bonded to the device and the cavity 26 bounded by the cover 12, the wafer 1 and the embedded waveguide 24, is evacuated so as to reduce damping of the resonator 11. The embedded waveguide 24 seals the groove 4 to prevent leakage into the evacuated cavity 26 whilst the "V" shaped portion allows an optical fibre 8 to be accurately aligned with the embedded waveguide.

It is thus possible to provide an optical device whereby alignment between optical waveguides and other elements, such as transducers, is reliably provided. The device is produced by a relatively simple and inexpensive manufacturing process. Further steps for aligning the optical waveguide are unnecessary so that the cost of manufacture can be reduced compared with known techniques, for instance for manufacturing resonant beam transducers. The mirror surface is accurately formed at 45° to the main surface of the device, thus permitting illumination and detection via a single waveguide, such as an optical fibre.

In the case of a resonant beam transducer or the like, the stability and accuracy of alignment and positioning permit the light path between the end 9 of the optical waveguide and the beam 11 via the mirror surface 7 to function as a Fabry-Perot cavity so as to permit optical detection of oscillation of the beam using interferometry. In particular, light is reflected back and forth along the bent optical path forming the cavity because of the accurate geometry possible with the device.

We claim:

1. An optical device, comprising a body of monocrystalline silicon having a body surface aligned in a {110} crystallographic plane, groove surfaces defining a groove formed in said body surface for containing an optical waveguide, said groove having an end portion having a longitudinal axis substantially along a <110>crystallographic axis, and an optical reflector facing said end portion of said groove and having an optically reflective surface in a {100} crystallographic plane.

2. A device as claimed in claim 1, in which a portion of said groove has groove surfaces in {111} crystallographic planes.

3. A device as claimed in claim 1, in which a portion of said groove has a substantially rectangular cross-section.

4. A device as claimed in claim 1, in which said body defines and has formed therein a well having a side defined by said optically reflective surface.

5. A device as claimed in claim 1, further comprising a resonant bridge formed in said body adjacent said optically reflective surface.

6. A device as claimed in claim 2 in which an optical fibre is bonded into said groove and said body defines and has formed therein a well having a side defined by said optically reflective surface, said well being substantially evacuated and sealed by a cover.

7. A device as claimed in claim 6, further comprising a resonant bridge formed in said body adjacent said optically reflective surface.

8. A device as claimed in claim 1, further comprising an optical waveguide embedded with a portion of said groove.

9. A device as claimed in claim 5, further comprising an optical waveguide embedded within a portion of said groove, and in which said body defines and has formed therein a well having a side defined by said optically reflective surface, said well being substantially evacuated and sealed by a cover.

10. A method of making an optical device, comprising:

etching a body of monocrystalline silicon having a body surface aligned in a {110} crystallographic plane to form an optical reflector by revealing an optically reflective surface in a {100} crystallographic plane; and forming a groove in said body surface for containing an optical waveguide, said groove having an end portion having a longitudinal axis substantially aligned with a <110> crystallographic axis, said optical reflector facing said end portion.

11. A method as claimed in claim 10, in which said optically reflective surface is formed by masking selected areas of said body surface with an etch resistant mask and anisotropically etching unmasked body surface areas.

12. A method as claimed in claim 10, in which at least a portion of said groove is formed by masking selected areas of said body surface with an etch resistant mask and anisotropically etching unmasked body surface areas to reveal groove surfaces in {111} crystallographic planes.

13. A method as claimed in claim 10, in which at least a portion of said groove is formed by plasma etching.

14. A method as claimed in claim 10, comprising doping a portion of said body surface with a dopant so as to provide a surface portion which is resistant to etching in order to provide a structure integral with said body.

15. A method as claimed in claim 14, in which said dopant is boron.

16. A method as claimed in claim 10, further comprising etching said body to form a well with one side being defined by said optically reflective surface.

* * * * *